US009948981B2

(12) United States Patent
Robertson et al.

(10) Patent No.: US 9,948,981 B2
(45) Date of Patent: Apr. 17, 2018

(54) UPSTREAM SIGNAL CAPTURE AND PROCESSING IN A SUBSCRIBER DEVICE

(71) Applicants: STMICROELECTRONICS, INC., Coppell, TX (US); STMICROELECTRONICS (GRENOBLE 2) SAS, Grenoble (FR)

(72) Inventors: Neil Robertson, Lilburn, GA (US); Jean-Yves Couet, Saint Martin le Vinoux (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 15/078,825

(22) Filed: Mar. 23, 2016

(65) Prior Publication Data
US 2016/0286268 A1 Sep. 29, 2016

Related U.S. Application Data

(60) Provisional application No. 62/136,804, filed on Mar. 23, 2015.

(51) Int. Cl.
*H04N 21/442* (2011.01)
*H04N 21/437* (2011.01)
(Continued)

(52) U.S. Cl.
CPC ... *H04N 21/44245* (2013.01); *H04N 7/17309* (2013.01); *H04N 21/437* (2013.01);
(Continued)

(58) Field of Classification Search
CPC .......... H04N 21/44245; H04N 21/437; H04N 21/6118; H04N 21/6168; H04N 21/6193
See application file for complete search history.

(56) References Cited

U.S. PATENT DOCUMENTS 6,895,043 B1 * 5/2005 Naegeli ............... H04L 12/2801
370/459
8,594,506 B1 * 11/2013 Farmer ............ H04B 10/25754
398/115
(Continued)

*Primary Examiner* — Brian T Pendleton
*Assistant Examiner* — Alexander Q Huerta
(74) *Attorney, Agent, or Firm* — Seed IP Law Group LLP

(57) ABSTRACT

An upstream signal capture device includes a signal capture circuit having a first port and a second port. The first port of the signal capture circuit is arranged for coupling to a diplexer. The upstream signal capture device also includes an amplifier having a first port and a second port, the first port of the amplifier coupled to the second port of the signal capture circuit, and an analog-to-digital converter (ADC) having a first port and a second port, the first port of the ADC coupled to the second port of the amplifier. The upstream signal capture device further includes a digital threshold detector having an input and output, the input of the digital threshold detector coupled to the second port of the analog-to-digital converter, and a memory configured to capture samples of the upstream signal. When using the upstream signal capture device to capture an upstream signal, a portion of an upstream signal is diverted into an analog-to-digital converter (ADC). A portion of the upstream signal is converted into a digital signal, and when the digital signal exceeds a threshold, the signal is captured in a memory.

18 Claims, 10 Drawing Sheets

(51) Int. Cl.
  *H04N 21/61*   (2011.01)
  *H04N 7/173*   (2011.01)
(52) U.S. Cl.
  CPC ..... *H04N 21/6118* (2013.01); *H04N 21/6168* (2013.01); *H04N 21/6193* (2013.01)

(56) References Cited

U.S. PATENT DOCUMENTS

| | | | | |
|---|---|---|---|---|
| 9,209,898 B1* | 12/2015 | Schemmann | ...... | H04B 10/2503 |
| 2002/0008777 A1* | 1/2002 | Ovadia | ............ | H04L 25/03343 348/470 |
| 2006/0026659 A1* | 2/2006 | McMullin | ........ | H04N 21/25883 725/111 |
| 2009/0161798 A1* | 6/2009 | Wong | ....................... | H04B 1/16 375/340 |
| 2010/0070228 A1* | 3/2010 | Chappell | ................ | H04N 7/173 702/79 |
| 2010/0131999 A1* | 5/2010 | Kfir | ..................... | H04L 12/2801 725/111 |
| 2010/0251320 A1* | 9/2010 | Shafer | .................... | H04N 7/102 725/121 |
| 2010/0251321 A1* | 9/2010 | Palinkas | ................ | H04N 7/102 725/127 |
| 2010/0301928 A1* | 12/2010 | Barth | ...................... | H04B 1/18 327/557 |
| 2012/0213259 A1* | 8/2012 | Renken | .............. | H04N 7/17309 375/222 |
| 2014/0010269 A1* | 1/2014 | Ling | ........................ | H04B 3/00 375/222 |
| 2015/0208137 A1* | 7/2015 | Alrutz | ................ | H04N 21/6118 725/124 |
| 2016/0028496 A1* | 1/2016 | Currivan | ................ | H04B 17/18 375/222 |
| 2016/0050127 A1* | 2/2016 | Prodan | .................... | H04B 3/46 375/222 |
| 2016/0112734 A1* | 4/2016 | Williams | ............... | H04H 20/78 725/118 |

* cited by examiner

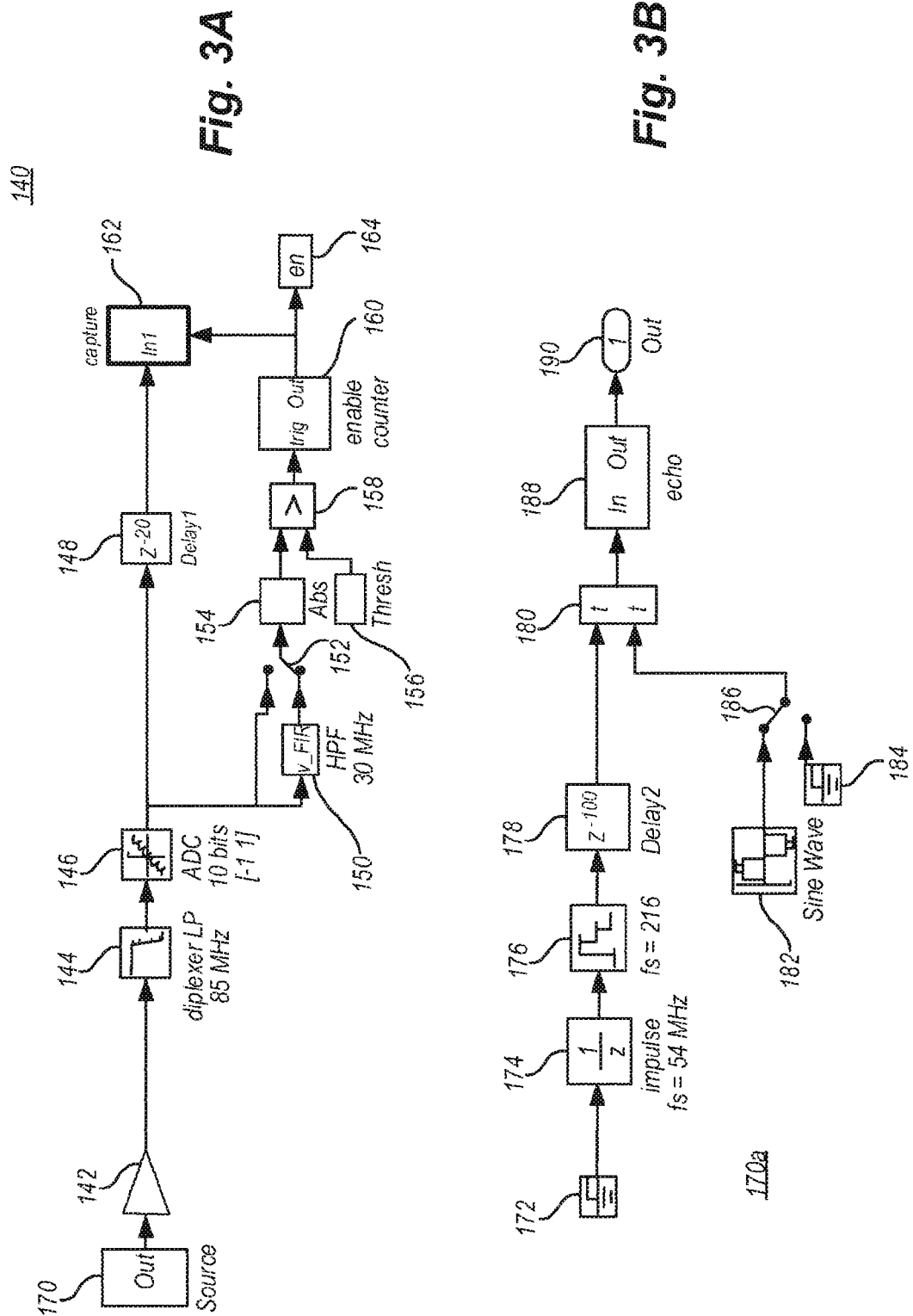

UPSTREAM SIGNAL CAPTURE AND PROCESSING IN A SUBSCRIBER DEVICE

BACKGROUND

Technical Field

The present disclosure generally relates to capturing and processing signals present in an upstream band on a home or business communications network. More particularly, but not exclusively, the present disclosure relates to capturing and processing said upstream band signals, including undesired interference and transients, produced in a subscriber device such as a set top box or produced in the closed environment of the subscriber device.

Description of the Related Art

People install subscriber devices in homes and businesses. One type of such subscriber device is a set top box. A subscriber device is typically coupled to a head-end system that receives multimedia programming such as television, movies, sports and the like. For example, a subscriber device may be coupled to an over-the-air antenna, a satellite reception device (e.g., a dish), or a cable system that delivers the programming to the subscriber device. The subscriber device is coupled to one or more output devices such as a video display, an audio subsystem, a recording device, and the like.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

In accordance with some embodiments described herein, particular circuitry is configured to detect and capture upstream signals in a receiving device.

In a first embodiment, an upstream signal capture device includes a signal capture circuit such as a signal pick-up circuit, voltage divider, attenuator, splitter, directional coupler, or other like structure having a first port and a second port. The first port of the signal capture circuit is arranged for coupling to a diplexer. The upstream signal capture device also includes an amplifier having a first port and a second port, the first port of the amplifier coupled to the second port of the signal capture circuit, and an analog-to-digital converter (ADC) having a first port and a second port, the first port of the ADC coupled to the second port of the amplifier. The upstream signal capture device further includes a digital threshold detector having an input and output, the input of the digital threshold detector coupled to the second port of the analog-to-digital converter, and a memory configured to capture samples (e.g., bits) of the upstream signal.

In a second embodiment, when using the upstream signal capture device to capture an upstream signal, a portion of an upstream signal is diverted into an analog-to-digital converter (ADC). A portion of the upstream signal is converted into a digital signal, and when the digital signal exceeds a threshold, the signal is captured in a memory.

These features with other objects and advantages which will become subsequently apparent reside in the details of construction and operation as more fully described hereafter and claimed, reference being had to the accompanying drawings forming a part hereof.

A subscriber device to receive multimedia programming content may be summarized as including: a port to pass control information on an upstream band and to pass the multimedia programming on a downstream band; a diplexer having a low-frequency portion to pass the control information between the port and a signal capture circuit and the diplexer having a high-frequency portion to pass the multimedia programming between the port and a digitizing circuit; a signal capture circuit (e.g., a signal pick-up circuit), the signal capture circuit having a tap port to pass a portion of the control information to an amplifier; an analog-to-digital converter (ADC) in the signal capture circuit to generate a digital representation of an amplified analog signal passed through the amplifier; a threshold detector in the signal capture circuit to generate a capture signal when the digital representation of the amplified analog signal crosses a determined threshold; and wherein the signal capture circuit is arranged to capture and store at least some samples (e.g., bits) of the digital representation of the amplified analog signal based on the capture signal.

The determined threshold may be programmable. The low-frequency portion of the diplexer may be arranged to pass signals having a frequency between about 5 MHz and 85 MHz. The subscriber device may include: a memory coupled to the signal capture circuit and dedicated to the storage of the at least some samples (e.g., bytes, nibbles, bits, or the like) of the digital representation of the amplified analog signal. The control information may be bi-directional. The signal capture circuit may be arranged to capture and store the at least some samples of the digital representation of the amplified analog signal only when the control information is received inbound from outside of the subscriber device.

An upstream signal capture device may be summarized as including: a signal capture circuit having a first port and a second port, the first port of the signal capture circuit arranged for coupling to a diplexer; an amplifier having a first port and a second port, the first port of the amplifier coupled to the second port of the signal capture circuit; an analog-to-digital converter (ADC) having a first port and a second port, the first port of the ADC coupled to the second port of the amplifier; a digital threshold detector having an input and output, the input of the digital threshold detector coupled to the second port of the analog-to-digital converter; and a random-access memory (RAM) configured to capture samples of the upstream signal.

The first port of the signal capture circuit may be arranged for coupling to a low frequency channel of the diplexer. The ADC may have at least 10 bits of digital resolution. A sampling frequency of the ADC may be between about 190 MHz and about 250 MHz. A sampling frequency of the ADC may be at least two times greater than a frequency of the upstream signal. The upstream signal may be provided by a set top box. The upstream signal capture device may include: a gate triggerable by a transmit-enable signal, the gate configured to disable capture of the upstream signal when the set top box is transmitting. The upstream signal capture device may include: a filter between the ADC and the digital threshold detector. The diplexer may be configured to pass an upstream signal having a frequency between 5 MHz and 85 MHz.

A method to capture an upstream signal in a subscriber device may be summarized as including: diverting a portion of an upstream signal into an analog-to-digital converter (ADC); converting a portion of the upstream signal into a digital signal; and when the digital signal exceeds a threshold, capturing the digital signal in a memory.

The method to capture an upstream signal in a subscriber device may include: amplifying the diverted signal. The method to capture an upstream signal in a subscriber device may include: converting the digital signal into at least 10 bits of resolution. The method to capture an upstream signal in a subscriber device may include: providing a trigger when the subscriber device is not transmitting; and applying the trigger to at least one act of diverting, converting, and capturing.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 3A is an exemplary block diagram embodiment of an upstream circuit;

FIG. 3B is a signal source embodiment model, which may be along the lines of the signal source in FIG. 3A;

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

A subscriber device is a type of receiving device, and the terms are used interchangeably. As used herein, a subscriber device (i.e., a receiving device) may perform the functions of a set top box, a cable modem, a cable telephone, or some other device. Subscriber devices may be placed, deployed, or otherwise installed in a home, a business, or some other environment, and any number of such subscriber devices may be located in the environment. Throughout the present disclosure, various ones of the corresponding figures illustrate embodiments of a subscriber device 100 (i.e., a receiving device 100).

Figure 1:
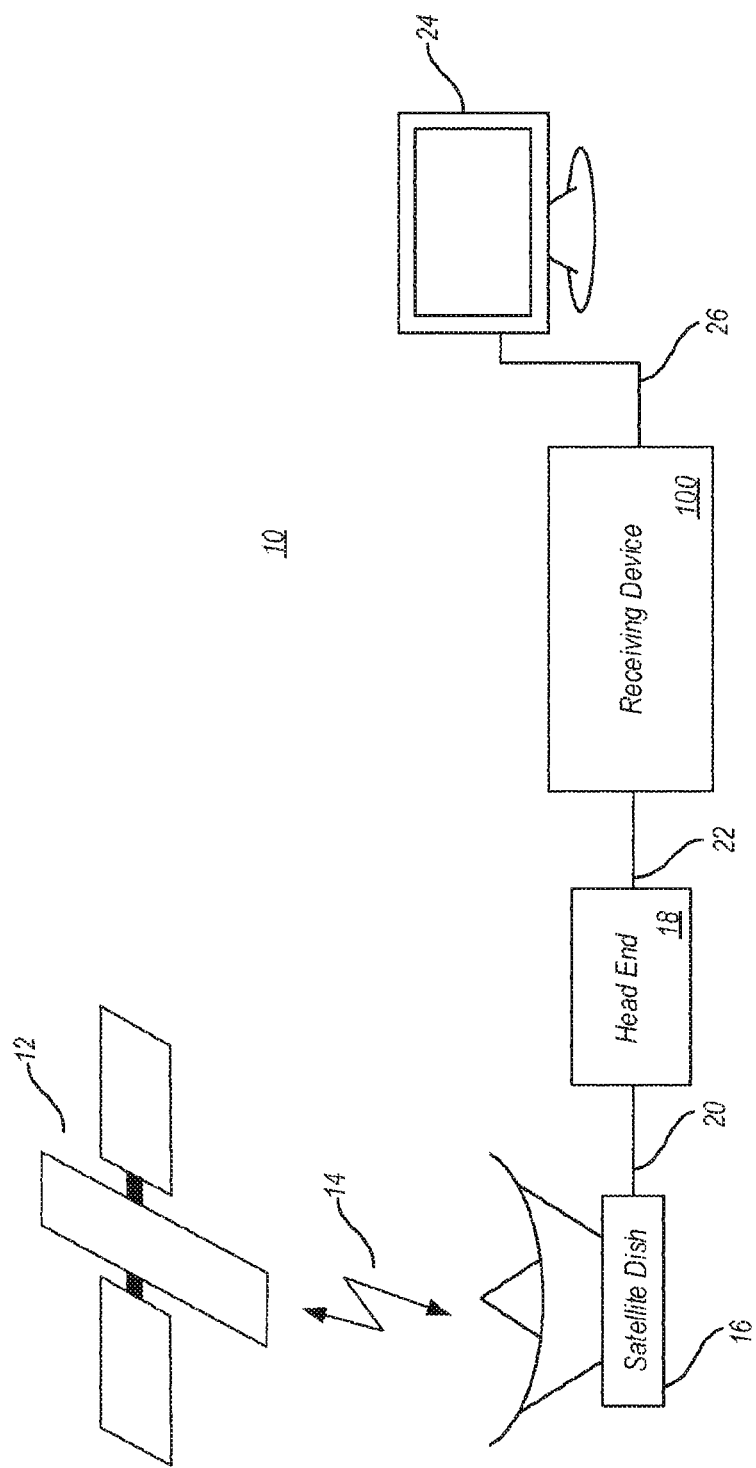
FIG. 1 is a programming delivery system.

FIG. 1 is a programming delivery system 10. A subscriber device 100 is coupled to a head-end system 18 that communicates information such as multimedia programming (e.g., television, movies, sports, and the like). The head-end 18 is an electronic device operating according to the direction or control of a cable programming operator, an Internet-based services operator, a satellite programming or computing operator, an over-the-air programming provider, or some other entity.

The subscriber device 100 may be so coupled to the head-end 18 via a communication means 22, which may include a wired medium (e.g., a coaxial cable, fiber optic cable, or the like), a wireless medium (e.g., a standardized or ad hoc radio frequency (RF) protocol), or a combination of wired and wireless media. In some embodiments, for example, a subscriber device 100 is coupled to an over-the-air antenna, a satellite reception device (e.g., a dish), or a cable system that delivers programming to the subscriber device 100 via a coaxial cable. The particular communication means 22 employed to pass the multimedia programming or other information may be electromechanically coupled to the subscriber device 100 via one or more ports.

The subscriber device 100 in FIG. 1 is further coupled to one or more output means 24 such as a video display, an audio subsystem, a recording device, and the like via a second communication means 26, which may include wired media, wireless media, or wired and wireless media that conforms to one or more standardized or non-standardized protocols (e.g., high-definition multimedia interface (HDMI), DISPLAYPORT, digital visual interface (DVI), and the like). The output means 24 may be fully or partially integrated with the subscriber device 100 or the output means 24 may be separate and distinct from the subscriber device 100.

The head-end system 18 in FIG. 1 is coupled by a third communication means 20, which may be the same type or a different type from communication means 22, to a satellite receiver 16 (i.e., a "dish"). The satellite receiver 16 receives satellite data 14 from a satellite 12. The satellite data may be in the 1 GHz to 2 GHz range, the 10 GHz to 18 GHz range, or some other range, which is typically considered to be in the microwave frequency range. In some cases, the satellite receiver 16 alternatively or in addition transmits satellite data 14 to the satellite 12.

In some cases, a receiving device 100 (i.e., a subscriber device) operates as a duplex device. The receiving device 100 in these cases passes information from a head-end 18 to the receiving device 100 and from the receiving device 100 to the head-end 18. Data, such as programming data, that is communicated from the head-end 18 to the receiving device 100 is discussed herein as downstream data. Data, such as control data, which is communicated from the receiving device 100 to the head-end 18, is discussed herein as upstream data. One or both of the downstream data and the upstream data may be bi-directional.

The receiving device 100 may communicate in conformance with a Data Over Cable Service Interface Specifications (DOCSIS) standard, such as the DOCSIS standard of Cable Television Laboratories, Inc. (i.e., CableLabs), the International Telecommunication Union (ITU), Europe, or the Multimedia Cable Network System Partners (MCNS). The receiving device may conform to one or more other standards.

The receiving device 100 includes both downstream and upstream signal path circuitry. Generally speaking, the downstream signal path is used to pass a large volume of data from a provider to the receiving device 100, and the upstream link is used to uni-directionally or bi-directionally pass control information or some other information between the head-end 18 and the receiving device 100. Data in the downstream band is often multimedia programming such as television programs, movies, sporting events, and the like. Data in the upstream band is often control information, scheduling information, billing information, service or other maintenance information, or the like. The uni-directional or bi-directional control information may include security information (e.g., security keys), private information (e.g., banking information, financial information, or the like), handshake information (e.g., acknowledge (ACK), not acknowledge (NACK), or the like), or any other control information.

In the embodiments discussed herein, signals present in an upstream band of a certain communications network (e.g., a home or business communications network) are captured and processed. The captured and processed signals may include undesired interference and transients produced in the receiving device 100.

The downstream signal path circuitry receives information from the head-end 18, which may be in 6-MHz channels in the 108 MHZ to 1000 MHz frequency range. In some cases, the downstream signal may also include lower frequencies, such as down to 54 MHz or higher frequencies above 1000 MHz. Frequency ranges for both downstream and upstream data communications are often country-specific.

The upstream signal path circuitry receives information that is to be transmitted out from the receiving device 100 to a head-end 18. The head-end 18 may be a device controlled by a provider of programming, a provider of other services, or some different entity. Upstream data signals may be transmitted on channels within the 5 MHz to 85 MHz range. In some cases, the upstream signals may also include frequencies lower or higher than 5 MHz and lower or higher than 85 MHz. Upstream channels may be allocated by type of service, line conditions, or based on other factors. Channel bandwidth for upstream signals can vary between 0.5 MHz and 2 MHz or within some other range. The rate of transmission of upstream signals may vary according to the type of data modulation (e.g., 64 quadrature amplitude modulation (QAM), 16 QAM, quadrature phase shift keying (QPSK), or the like). In some cases, upstream signal data may be transmitted at about 200 kilobits per second (kbits/s).

Signals communicated on the upstream link may include undesired transients, interference, or other non-data components. In some cases, it is desirable for a receiving device to capture and process signals on the upstream link including the undesired transients, interference, or other non-data components. In these cases, the upstream capture circuitry may be integrated in or separately formed for use with a suitable receiving device 100.

Figure 2:
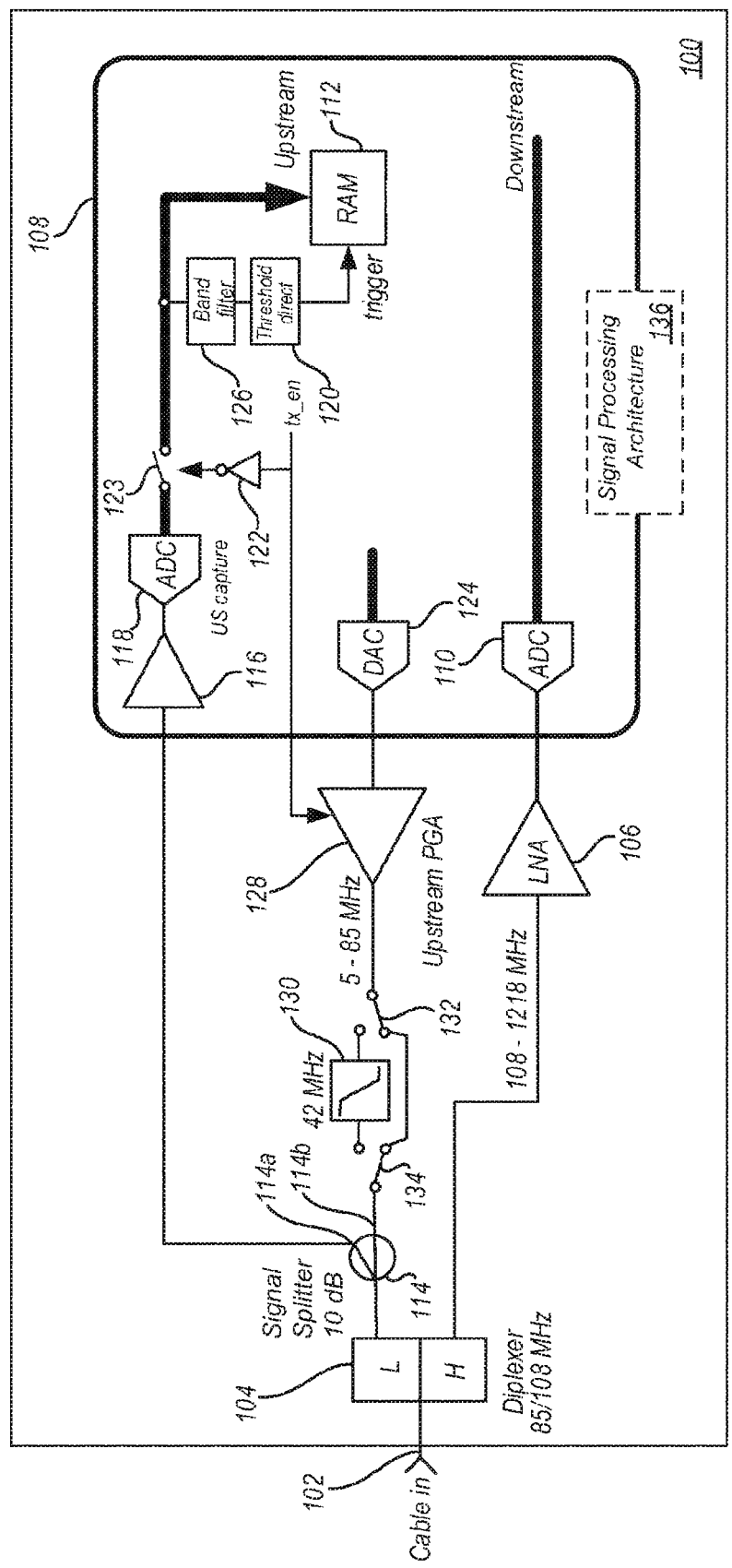
FIG. 2 illustrates a receiving device embodiment block diagram.

FIG. 2 illustrates a receiving device 100 embodiment block diagram. In the receiving device 100, a cable port 102 provides a means for a communicative coupling to a head-end 18 (FIG. 1). The cable port 102 represents a point in receiving device 100 where information is received and where information is transmitted. Cable port 102 may be embodied as one or more physical ports, a multiplexed port, a wireless port, or even a logical port. Such embodiments of cable port 102 provide a means of electrically or electro-mechanically coupling a communication medium to the receiving device 100.

A diplexer 104 includes logic to split incoming signals into two bands based on frequency. In the embodiment of FIG. 2, a first circuit L of diplexer 104 splits incoming signals according to a lower frequency upstream band (e.g., 5 MHz to 85 MHz), and a second circuit H splits incoming signals according to a higher frequency downstream band (e.g., 108 MHz to 1000 MHz or higher).

The incoming downstream signals are amplified at low-noise amplifier (LNA) 106 before passing into a front-end 108 of the receiving device 100. Once in the front-end 108, the downstream signals are digitized by an analog-to-digital converter (ADC) 110 and processed by signal processing architecture 136 in a known way. The signal processing architecture 136 may include one or more digital signal processors, clocks, memories, and other such circuits, which are not shown for simplicity.

Operations of one or more parts of the receiving device 100 and front-end 108 may be controlled by a processing circuit such as processor 136. The processing circuit may be dedicated to the receiving device 100, dedicated to the front-end 108, shared between multiple devices, or formed in any other suitable arrangement.

A signal capture circuit 114 is coupled directly or indirectly to the low-pass circuitry of diplexer 104. The signal capture circuit 114, which may be signal pick-up circuit, a voltage divider, an attenuator, a splitter, a directional coupler, or some other like structure, includes a tap port circuit 114a that diverts a portion of an incoming signal in the upstream band. The diversion may cause a small loss of signal strength to an outgoing signal transmitted by the receiving device 100. In some embodiments the signal capture circuit may have three ports (i.e., a directional coupler) wherein a first port is coupled to the low pass circuitry of diplexer 104, a second port is coupled to the amplifier 116, and a third port coupled to the switch 134. In some embodiments, signal capture circuit 114 has high isolation properties, which prevent undesirable signals from passing out of the signal capture circuit 114 between the output port 114b and the tap port 114a. This isolation also helps to prevent the receiving device 100 transmitter from over-driving the amplifier 116 used for signal capture.

The output from the tap port 114a logic of the signal capture circuit 114 is amplified by an amplifier 116 and passed to a high-speed analog-to-digital converter (ADC) 118. In some embodiments, the ADC 118 has a sample rate of at least twice the highest frequency to be captured. For example, the sampling frequency of ADC 118 may be in the range of 190 MHz to 250 MHz, which is at least two times higher than a signal in an upstream band when the upstream band is defined as 5 MHz to 85 MHz. The ADC 118 output is arranged in some embodiments to be 10 bits wide, but other resolutions are also contemplated.

Amplified and digitized signals in the front-end 108 may then be applied to a digital threshold detection circuit 120. The digital threshold detection circuit 120 determines if the incoming signal amplitude exceeds or otherwise meets a threshold, which in some embodiments is a configurable threshold. When the threshold is met, the threshold detection circuit 120 creates a trigger to enable capture of the signal in a memory such as memory 112. Memory 112 is illustrated as a random access memory (RAM), which may perform as a data buffer, but other memory architectures are also contemplated. In some cases, the upstream signal is captured in the same memory as the downstream information, as shown in FIG. 2. In other cases, the upstream signal is captured in a dedicated memory.

Embodiments of the upstream signal path circuitry may be configured with one or more optional circuit features. For example, the upstream signal path circuitry may in some cases be controlled by a gate 122 operated at the direction of a transmit enable (tx_en) signal. In this way, signals that would otherwise pass through amplifier 116 and ADC 118 will be ignored during upstream transmissions initiated by the receiver device 100. Using this feature, only signals originating outside of the receiving device 100 will trigger a capture. In addition, or in the alternative, the upstream signal path circuitry may also be controlled by a switch 123. Switch 123 may be directed by a processor, a voltage threshold on the upstream signal path, a count resolution of the ADC 118, the tx_en signal, a clock signal, or another suitable means.

In another exemplary feature, gate 122 and the transmit enable signal tx_en signal are used expressly to capture transmissions made by the receiving device 100. In this way, the captured signal can then be processed to provide a spectrum of the transmitted upstream signal. Along these lines, the memory 112 may optionally be used to capture an outgoing digital upstream signal of the receiver device 100 before the digital signal is converted to analog by a digital-to-analog converter (DAC) 124. In some cases, the stored digital signal is processed to provide a spectrum of the transmitted upstream signal. In other cases, the spectrum of the signal captured after passing through DAC 124, signal capture circuit 114, amplifier 116, and ADC 118 is compared to the signal captured directly in memory 112.

In some other embodiments, a digital filter 126 is optionally placed in front of the threshold detector 120. The digital filter 126 may be used to pass only signals in a determined frequency band. For example, a high-pass filter would prevent lower frequency signals from triggering a capture.

In yet other embodiments, signal capture operations may be triggered by a time stamp. In these and in other alternative embodiments, a time stamp associated with a trigger or capture may also be stored and associated with the captured data.

Once a signal is captured, the signal may be processed by any one or more of various techniques. In one technique, for example, data of the signal is cyclically rotated to place a transient event in the center of the capture. Along these lines, a windowing algorithm may also be used. Discrete Fourier transformation (called DFT) or fast Fourier transformation (called FFT) may be used to compute the spectrum. FFT averaging techniques, which average the FFT's of several captures to reduce variation in the spectrum, may also be performed.

Also illustrated in FIG. 2 are a programmable gain amplifier 128, a discriminating circuit 130, and a pair of switches 132, 134 to optionally engage the discriminating circuit 130. In some embodiments, logic to implement the functions, control signals, and other operational characteristics described herein is constituted partially or exclusively in hardware. In other embodiments, one or more of the functions, control signals, and other operational characteristics are constituted in whole or in part via software instructions stored in memory (e.g., memory 112) and executed by a processor of the signal processing architecture 136.

For simplicity, other circuits and their associated features of the receiving device 100 are not shown or described for simplicity.

FIG. 3A is an exemplary block diagram embodiment of an upstream circuit 140. The model circuit of FIG. 3A, described in more detail below, includes a diplexer low pass filter (LPF) and an analog-to-digital converter (ADC) to capture the signal. A threshold circuit detects the signal and produces a trigger pulse. The length of the capture window is programmable. Windowing and Fast Fourier Transform (FFT) are performed in hardware, software, or a combination of hardware and software. FFT averaging can be used to capture an upstream signal spectrum along the lines as is done with a downstream spectrum capture. A threshold detector includes a high pass filter (HPF) to remove lower frequency noise, which allows capturing a transient in the presence of a continuous low frequency interferer, as shown, for example in the spectrum plots of FIGS. 4A-4F.

The duration of the capture compared to the transient signal duration, and thus the energy of the transient signal, is controllable and desirably selected relevant to the predicted transient. If the capture is long compared to the transient duration, the spectrum of the transient will be driven below the noise floor of the ADC. If the capture window is short, the transient signal may be missed. The capture length can be preset, dynamically set, or controlled in another manner. Alternatively, a long capture can be made and then truncated, for example in software, prior to computing the FFT. In either case, the frequency resolution of a short transient will be coarser than that of a long transient.

A signal source 170 such as a satellite programming system, a cable television programming system, or another system communicates data uni-directionally or bi-directionally. The data may be communicated to the upstream circuit 140, from the upstream circuit 140, or to and from the upstream circuit 140. As illustrated in FIG. 3A, signal source 170 provides control information on a low frequency band to the upstream circuit 140.

Signal conditioning logic 142 may include an amplifier circuit, an attenuation circuit, a filter, or some other device or circuit means to condition the control information passed into the upstream circuit 140. In some cases, diplexer logic 144 operates as an isolation bandpass filter circuit to discriminate information provided by signal source 170 based on one or more frequencies. For example, in some cases, diplexer logic 144 isolates and passes control information modulated or otherwise integrated with a carrier frequency of about 85 MHz. Other frequencies, such as frequencies between about 5 MHz and 85 MHz are also contemplated.

The isolated control information signal from the diplexer logic 144 is sampled by an ADC 146. The ADC 146 may provide a digital representation of the control information as a multibit signal having 8 bits, 10 bits, 16 bits, or some other number of bits. The multibit signal from ADC 146 is passed to a delay buffer 148, a finite impulse response (FIR) filter 150, and a switch circuit 152.

In some cases, the multibit signal from ADC 146 is passed through switch circuit 152 to an absolute value circuit 154. In other cases, the signal component generated by FIR filter 150 is passed through switch circuit 152 to the absolute value circuit 154 The FIR filter 150 of FIG. 3A may be arranged, for example, as a 30 MHz high pass filter (HPF).

Absolute value circuit 154 provides a magnitude representative of the signal that is passed through switch circuit 152. The magnitude is compared to a threshold value 156 in comparator logic 158. A numerical value stored in the repository of threshold value 156 may be controllably selected in advance, or the actual value may be set dynamically. If the threshold value is crossed, as determined by comparator logic 158, a trigger signal is generated and passed into an enable counter 160. When the enable counter 160 reaches a programmable number of counts, a capture signal is generated. The capture signal is passed to capture logic 162 and an output enable means 164. The output enable means 164 may be a pad, a pin, a signal trace, or some other output mechanism to pass an output signal.

Embodiments of capture logic 162 include means to store a signal from delay buffer 148 upon an assertion of the generated capture signal. The signal stored in the delay buffer 148 may be collected over time as a capture window. The capture window signal may be absent any low frequency components due to the FIR filter 150, which can be arranged as a high pass filter to only pass, for example, signals over 30 MHz. In this way, the captured signal may include a transient in the presence of a continuous low frequency interferer. In some cases, the capture logic 162 also includes means to perform the FFT, generate a Hanning window, identify a particular transient, and measure or otherwise detect an energy level of the transient at a particular frequency resolution.

FIG. 3B is a signal source 170a embodiment model, which may be along the lines of signal source 170 in FIG. 3A. In the model of FIG. 3B, described in more detail below, a signal source circuit 170a provides a transient plus continuous wave (CW) interferer plus multipath signal. The output of the signal source 170a may be passed to an upstream circuit such as the upstream circuit 140 of FIG. 3A.

A reference source 172 supplies a signal to a spectrum analysis Fourier series (FS) function 174 with a particular frequency impulse, 54 MHz for example, a particular sample count 176 function, 216 for example or some other frequency multiple, and a delay circuit 178 arranged at a particular window size. The output from the delay circuit 178 is applied to an integration logic function 180, which may be an integrator, comparator, multiplier, or other like logic. Concurrently, a signal generator 182 and a second reference source 184 apply signals to a switch circuit 186, which controllably passes a control information signal the integration logic function 180. An output of the integration logic function 180 is passed to an echo logic function 188 and output 190.

Figure 4B:
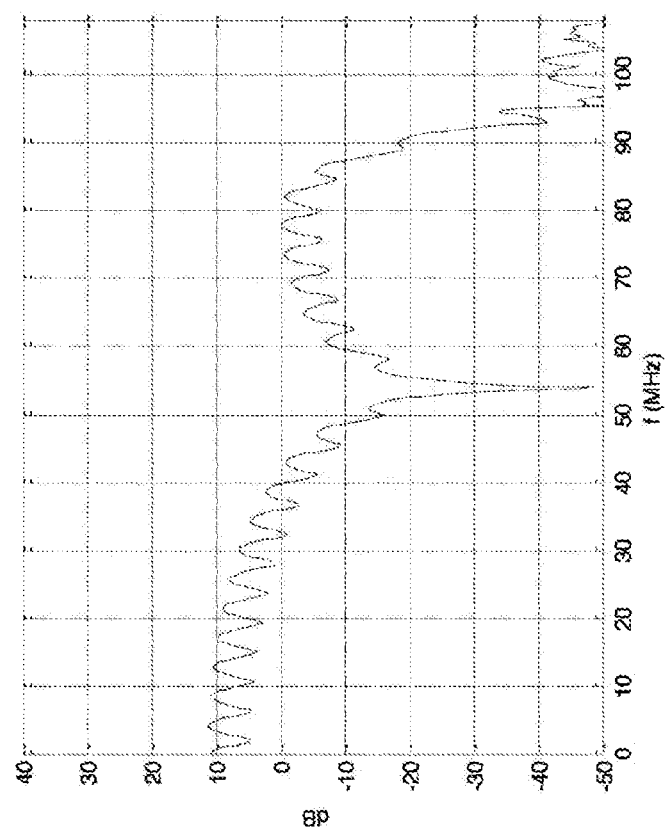
FIGS. 4A-4E illustrate exemplary results of the signal sources and upstream circuits of FIGS. 3A-3B.
Figure 4A:
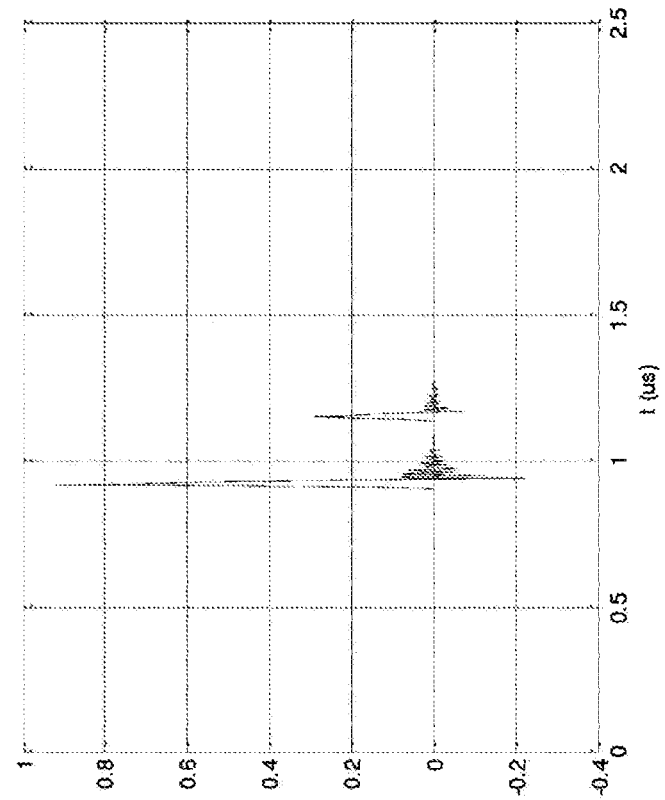
Figure 4D:
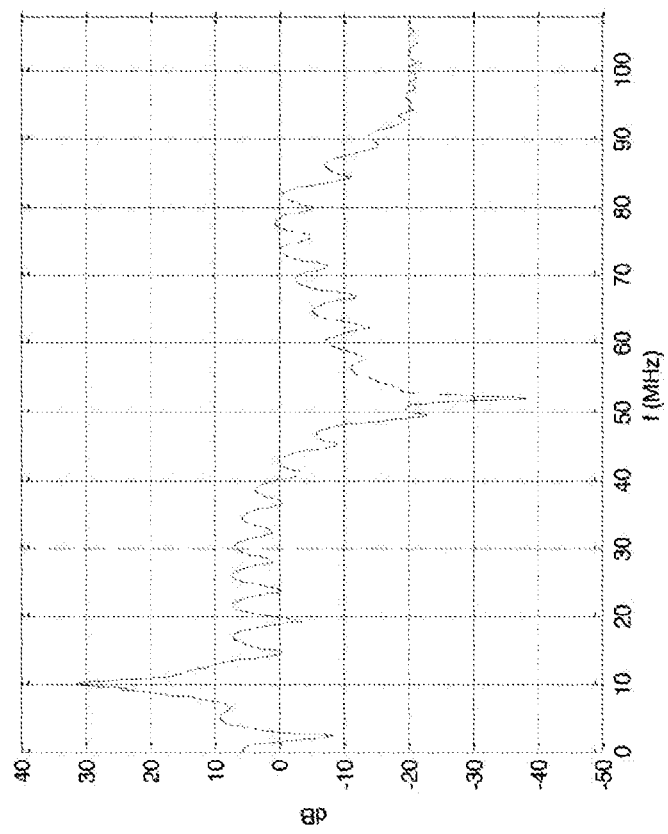
Figure 4C:
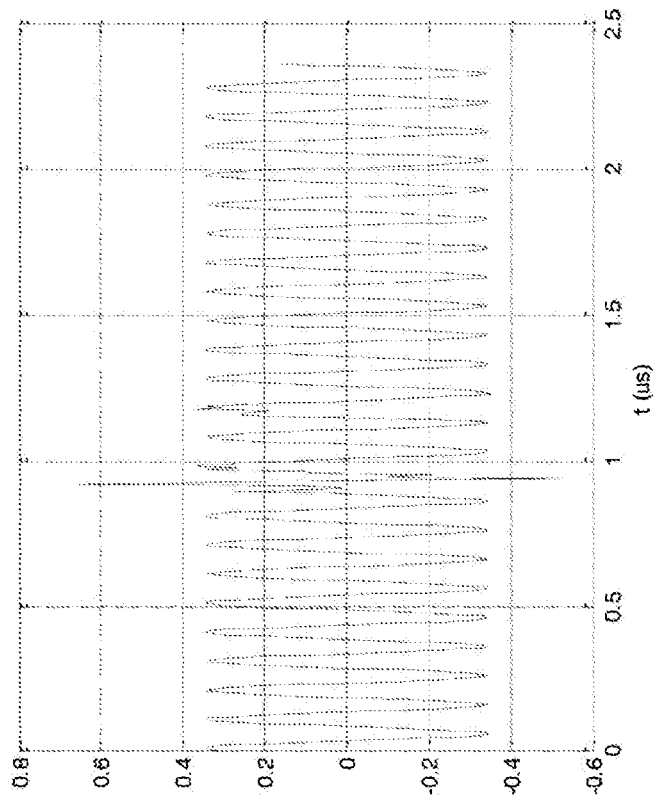
Figure 4E:
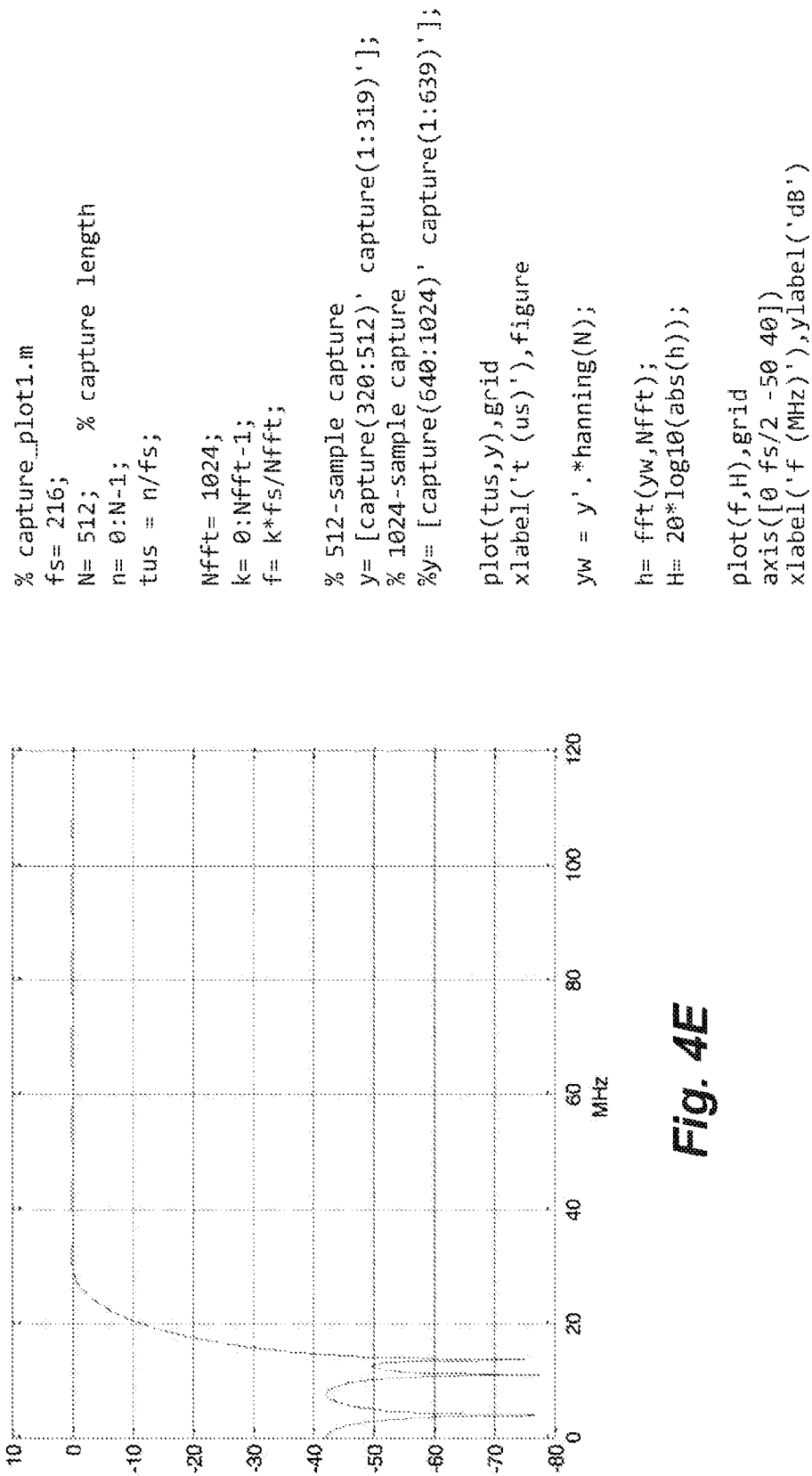

The operation of various models including models according to FIGS. 3A and 3B has been implemented with particular results. FIG. 4A illustrates a 512-point capture with cyclic shift of 192 samples. The cyclic shift places the start of the transient near the peak of the Hanning window. FIG. 4B is an FFT of a 512-point capture, using a Hanning window. FIG. 4C is a 512-point capture with transient+CW at 10 MHz (with cyclic shift of 192 samples), and FIG. 4D is an FFT of a 512-point capture, using Hanning window. FIG. 4E is a response plot wherein a 30 MHz high pass filter (HPF) is employed in the upstream circuit 140. FIG. 4E also illustrates an exemplary program code of a particular multi-paradigm numerical computing environment.

Figure 5:
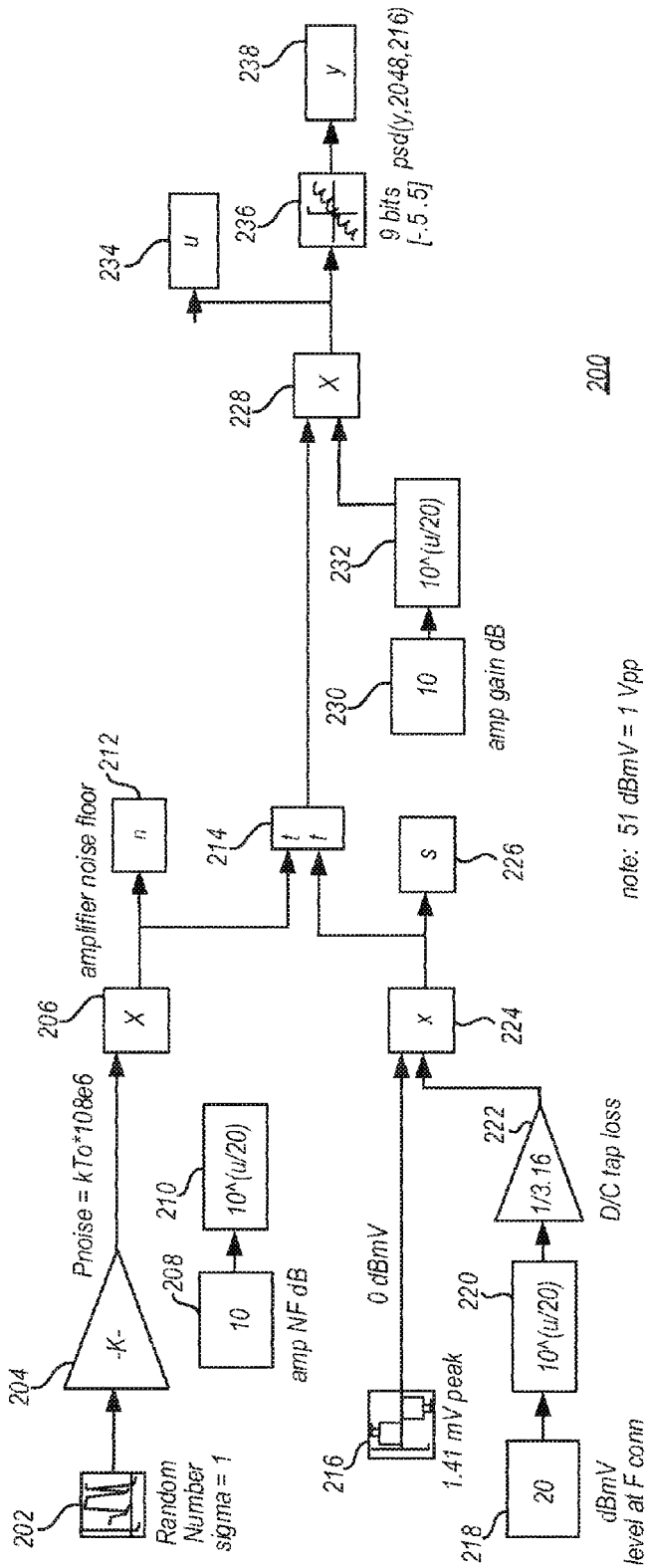
FIG. 5 is a noise model embodiment of an upstream spectrum capture amplifier and an ADC circuit.

FIG. 5 is a noise model embodiment 200 of an upstream spectrum capture amplifier and ADC circuit. In the noise model embodiment 200, a signal generator 202 produces a random number signal, which is amplified, attenuated, or otherwise passed via an amplifier function 204 to a first multiplier function 206. A noise floor injection function 208 coupled to a particular noise floor power function 210 having a determined bandwidth and frequency component provide a second input to the first multiplier function 206. The output of the first multiplier function 206 provides an amplifier noise floor output 212, which signal is also applied to an integration function 214.

A sine wave generation function 216 provides a first input into a second multiplier function 224, and a second input into the second multiplier function 224 is provided by a signal injection circuit. The signal injection circuit includes a signal injection function 218 at an F connector, a signal power function 220, and an amplification/attenuation function 222. The output of the second multiplier function 224 provides a signal output 226, which signal is also applied to the integration function 214.

The integrated output of the integration function 214 is passed to a first input of a third multiplier 228. The second input of the third multiplier 228 is provided by a second signal injection circuit formed with a second signal injection function 230 and a second signal power function 232. The second signal injection circuit may be used for signal normalization or to otherwise adjust the integrated signal output from the integration function 214. The output of the third multiplier function 228 is passed to an integrated signal output 234 and an ADC 236 having a determined effective number of bits (ENOBs). The output of the noise model embodiment 200 is passed to a power spectral density function 238.

Several noise model embodiments along the lines of that illustrated in FIG. 5 have been implemented and tested with a particular multi-paradigm numerical computing environment such as MATLAB. The noise model embodiments include several controllable (e.g., programmable, electronically configurable, and like) parameters, optional functions, and the like. For example, the noise model embodiment 200 includes a controllable amplifier noise floor, a controllable ADC effective number of bits (ENOBs), controllable amplifier noise figures, controllable amplifier gain, and the like. In some embodiments such as those illustrated in FIGS. 5 and 6A-6F, distortion is not modeled, and in other embodiments, distortion may be modeled.

The operation of various models, including models crafted according to FIG. 5, has been implemented with particular results. The particular results are illustrated as particular power spectrum plots in FIGS. 6A-6F. In these cases, amplifier gain and an amplifier noise figure are made variable. Also in these cases, the ADC full-scale input is 1 Vpp, the ADC sample rate is 216 MHz, and the effective number of bits (ENOBs) of the ADC is 9. A capture length is 16,384 samples, an FFT length is set to 204, and a frequency resolution is 216e6/2048=105 kHz.

Figure 6B:
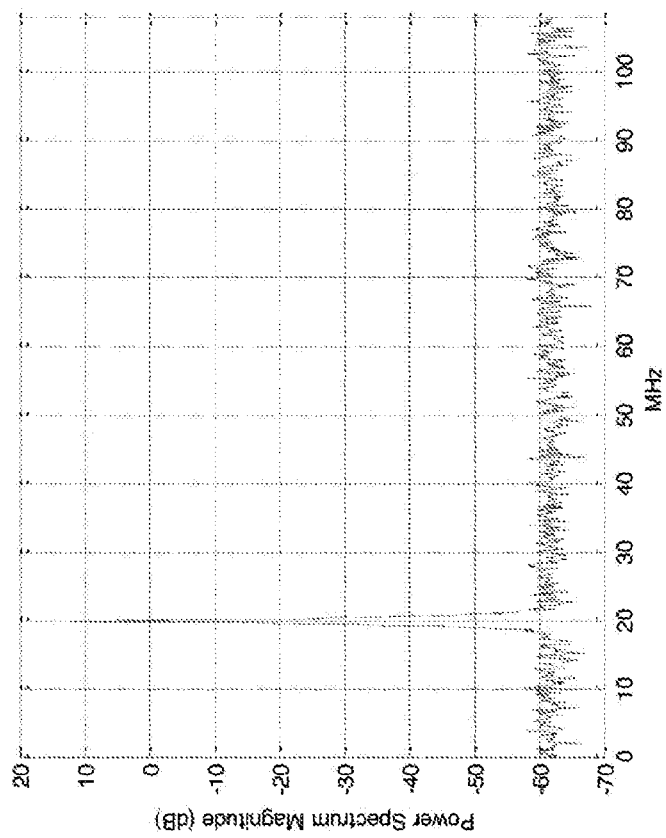
FIGS. 6A-6F illustrate exemplary power spectrum plots of a modeled upstream spectrum capture amplifier and ADC circuits.
Figure 6A:
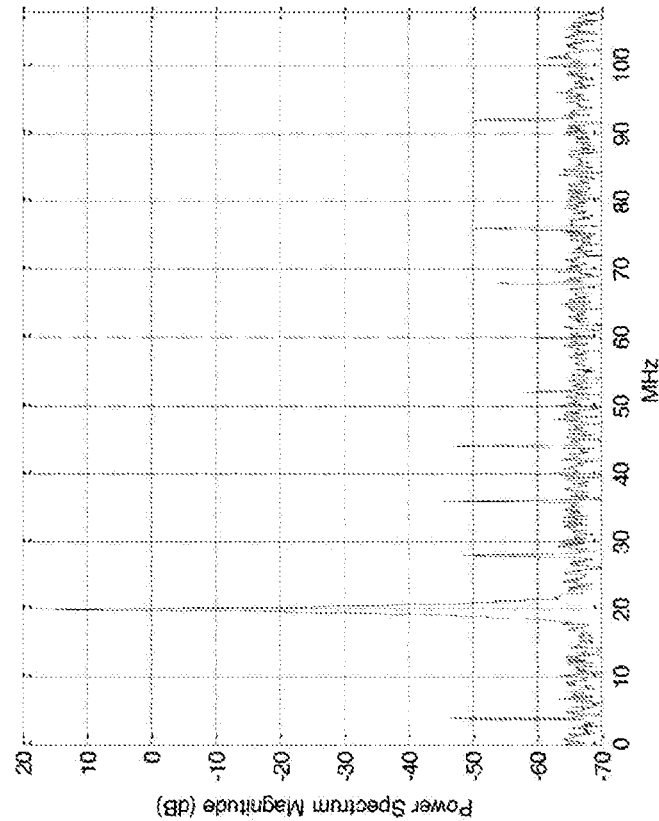
Figure 6D:
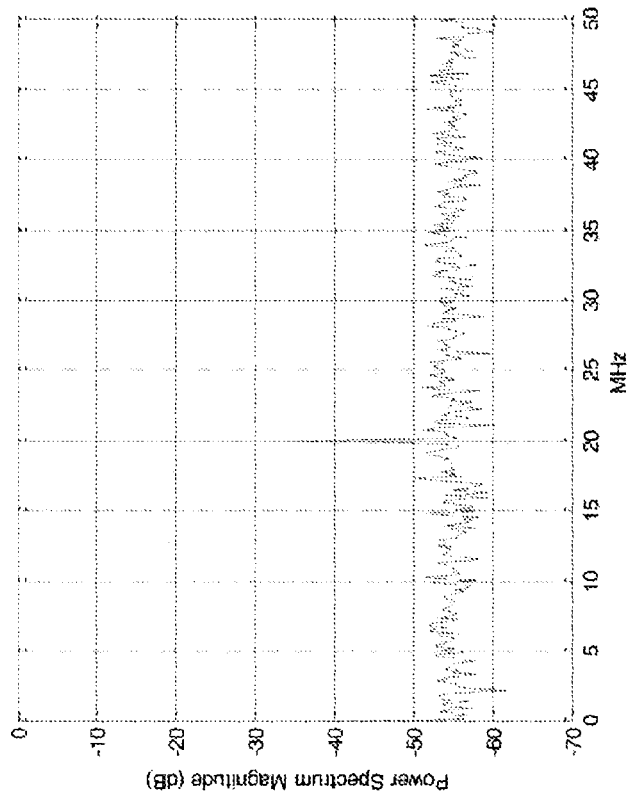
Figure 6C:
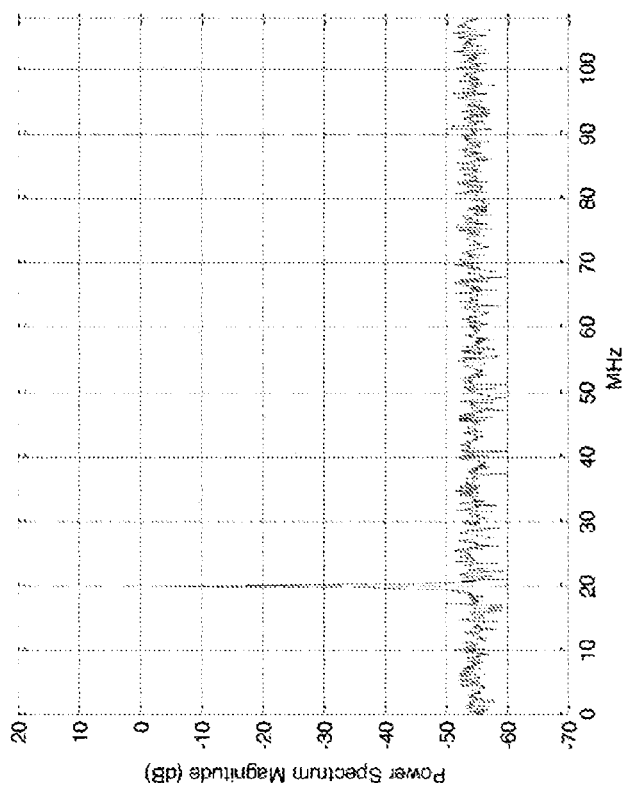

FIG. 6A illustrates a power spectrum plot according to a model having a 60 dBmV CW at the F connector. In FIG. 6A, the amplifier is bypassed, no amplifier distortion was modeled, the ADC ENOB is nine (9) bits, and the power spectral density (PSD) function is formed as psd(y, 2048, 216). In contrast, FIG. 6B illustrates a power spectrum plot according to a model having a 60 dBmV CW at the F connector, an implemented amplifier having a gain of 0 dB, a noise floor (NF) of 10 dB, a nine (9) bit ADC ENOB, and a PSD function formed as psd(y, 2048, 216). In the plot of FIG. 6B, no amplifier distortion was modeled, The power spectrum plots of FIGS. 6C and 6D may also be contrasted. In FIG. 6C, a model having a 30 dBmV CW at the F connector is implemented, and in FIG. 6D, a model having 0 dBmV CW at the F connector is implemented. In both FIG. 6C, an implemented amplifier has a gain of 10 dB, a noise floor (NF) of 10 dB, a nine (9) bit ADC ENOB, and a PSD function formed as psd(y, 2048, 216). No amplifier distortion was modeled in the power spectrum plots of FIGS. 6C and 6D.

Figures 6E, 6F:
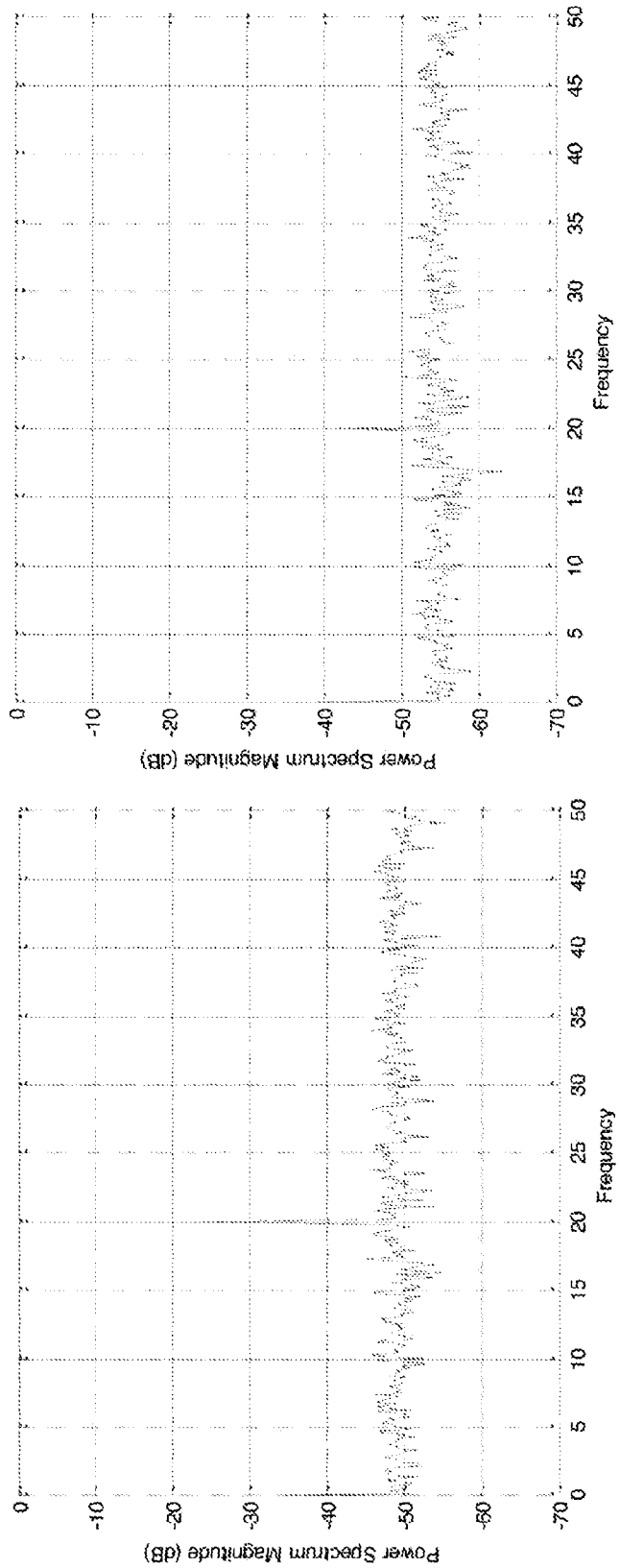

Further contrast may be drawn from the power spectrum plots of FIGS. 6E and 6F. In both plots, a model having 0 dBmV CW at the F connector is implemented, a nine (9) bit ADC ENOB is implemented, and a PSD function is formed as psd(y, 2048, 216). In FIG. 6E, however, an amplifier with a 20 dB gain and a noise floor of 6 dB is implemented, while in FIG. 6F, an amplifier with a 0 dB gain and a 20 dB noise floor is implemented.

Further considering the embodiment of FIG. 5 in view of the power spectrum plots of FIGS. 6A-6F, when an amplifier gain is about 10 dB and a noise floor figure is about 10 dB, the dynamic range at the F connector extends from roughly 0 dBmV to 50 dBmV. In these cases, for a CW input of 0 dBmV at the F connector, the ADC output is about 20 dB above the noise floor. It has been learned that more sensitivity can be provided when the FFT length is increased; however, it has also been learned that longer FFT's will not necessarily help sensitivity when the signal bandwidth is greater than the FFT frequency resolution. It has further been learned that for low input levels, clock spurs may be cause measurable and undesirable results, particularly if the input to the amplifier is single-ended. What's more, it has also been learned that when an amplifier is bypassed or otherwise not effective, the noise floor is substantially determined by the ADC. On the other hand, when the amplifier is implemented, the noise floor is substantially determined by the noise floor figure of the amplifier and the ADC implementation parameters have little or no effect.

In the embodiments of present disclosure, particular signals are passed to and from a receiving device. The various components and devices of the embodiments are interchangeably described herein as "coupled," "connected," "attached," and the like. It is recognized that unless otherwise stated as "directly connected" or "directly coupled," the various components and devices may be formed with other intervening components. In addition, all of the components to process upstream signals may be formed in a single integrated circuit, and the integrated circuit may also include circuits that perform other functions.

The diversion, amplification, threshold detection, and capture of signals may be performed with a variety of processes. In this regard, each described process may represent a module, segment, or portion of software code, which comprises one or more executable instructions for implementing specified logical function(s). It should also be noted that in some implementations, the functions noted in the process may occur in a different order, may include additional functions, may occur concurrently, and/or may be omitted.

The figures in the present disclosure illustrate portions of one or more non-limiting receiving device embodiments such as the front-end 108. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processors, as described herein, include central processing units (CPU's), microcontrollers (MCU), digital signal processors (DSP), application specific integrated circuits (ASIC), and the like. The processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, embodiments describe software executable by the processor and operable to execute certain ones of the method acts.

When so arranged as described herein, each receiving device may be transformed from a generic and unspecific computing device to a combination device comprising hardware and software configured for a specific and particular purpose.

As known by one skilled in the art, a computing device such as receiving device 100 has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor.

The receiving devices illustrated herein may further include operative software found in a conventional computing device such as an operating system or task loop, software drivers to direct operations through I/O circuitry, networking circuitry, and other peripheral component circuitry. In addition, the receiving devices may include operative application software such as network software for communicating with other computing devices, database software for building and maintaining databases, and task management software where appropriate, for distributing the communication and/or operational workload amongst various processors. In some cases, the receiving device is a single hardware machine having at least some of the hardware and software listed herein, and in other cases, the receiving device is a networked collection of hardware and software machines working together to execute the functions of one or more embodiments described herein. Some aspects of conventional hardware and software of known receiving devices are not shown in the figures for simplicity.

When so arranged as described herein, each receiving device may be transformed from a generic and unspecific computing device to a combination device comprising hardware and software configured for a specific and particular purpose.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as the front-end 108 may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, WiFi, Worldwide Interoperability for Microwave Access (WiMax), or the like.

In some cases, memory 112 or some other memory is a non-transitory computer readable medium (CRM). The CRM is configured to store computing instructions executable by a CPU of the receiving device 100. The computing instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of receiving device 100.

Buttons, keypads, computer mice, memory cards, serial ports, bio-sensor readers, touch screens, and the like may individually or in cooperation be useful to an operator of the receiving device 100. The devices may, for example, input control information into the system. Displays, printers, memory cards, LED indicators, temperature sensors, audio devices (e.g., speakers, piezo device, etc.), vibrators, and the like are all useful to present output information to the operator of the receiving device 100. In some cases, the input and output devices are directly coupled to the front-end 108 and electronically coupled to a CPU or other operative circuitry. In other cases, the input and output devices pass information via one or more communication ports (e.g., RS-232, RS-485, infrared, USB, etc.)

As described herein, for simplicity, a user of a receiving device may in some cases be described in the context of the male gender. It is understood that a medical practitioner can be of any gender, and the terms "he," "his," and the like as used herein are to be interpreted broadly inclusive of all known gender definitions.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks, have not been shown or described in detail to avoid unnecessarily obscuring descriptions of the embodiments.

Unless the context requires otherwise, throughout the specification and the claims which follow, the word "comprise" and variations thereof, such as "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases in "one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A subscriber device to receive multimedia programming content, the subscriber device comprising:
 a port to pass control information on an upstream band and to pass the multimedia programming content on a downstream band;
 a diplexer having a low-frequency portion to pass the control information between the port and a signal capture circuit and the diplexer having a high-frequency portion to pass the multimedia programming content between the port and a digitizing circuit;
 a signal pickup circuit in the signal capture circuit, the signal pickup circuit having a tap port to pass a portion of the control information to an amplifier;
 an analog-to-digital converter (ADC) in the signal capture circuit to generate a digital representation of an amplified analog signal passed through the amplifier;
 a threshold detector in the signal capture circuit to generate a capture signal when the digital representation of the amplified analog signal crosses a determined threshold; and
 a gate triggerable by a transmit-enable signal, wherein the signal capture circuit is arranged to capture and store at least some samples of the digital representation of the amplified analog signal based on the capture signal, and wherein the gate is arranged to disable capture of an upstream signal when the subscriber device is transmitting.

2. The subscriber device of claim 1 wherein the determined threshold is programmable.

3. The subscriber device of claim 1 wherein the low-frequency portion of the diplexer is arranged to pass signals having a frequency between 5 MHz and 85 MHz.

4. The subscriber device of claim 1, comprising:
a memory coupled to the signal capture circuit and dedicated to the storage of the at least some samples of the digital representation of the amplified analog signal.

5. The subscriber device of claim 1 wherein the control information is bi-directional.

6. The subscriber device of claim 5 wherein the signal capture circuit is arranged to capture and store the at least some samples of the digital representation of the amplified analog signal only when the control information is received inbound from outside of the subscriber device.

7. An upstream signal capture device, comprising:
a signal capture circuit having a first port and a second port, the first port of the signal capture circuit arranged for coupling to a diplexer;
an amplifier having a first port and a second port, the first port of the amplifier coupled to the second port of the signal capture circuit;
an analog-to-digital converter (ADC) having a first port and a second port, the first port of the ADC coupled to the second port of the amplifier;
a digital threshold detector having an input and an output, the input of the digital threshold detector coupled to the second port of the analog-to-digital converter;
a random-access memory (RAM) configured to capture samples of an upstream signal passed through the second port of the signal capture circuit; and
a gate triggerable by a transmit-enable signal, the gate configured to disable capture of the upstream signal when the upstream signal capture device is transmitting.

8. The upstream signal capture device of claim 7 wherein the first port of the signal capture circuit is arranged for coupling to a low frequency channel of the diplexer.

9. The upstream signal capture device of claim 7 wherein the ADC has at least 10 bits of digital resolution.

10. The upstream signal capture device of claim 7 wherein a sampling frequency of the ADC is between 190 MHz and 250 MHz.

11. The upstream signal capture device of claim 7 wherein a sampling frequency of the ADC is at least two times greater than a frequency of the upstream signal.

12. The upstream signal capture device of claim 7 wherein the upstream signal is provided by a set top box.

13. The upstream signal capture device of claim 7, comprising:
a filter between the ADC and the digital threshold detector.

14. The upstream signal capture device of claim 7 wherein the diplexer is configured to pass an upstream signal having a frequency between 5 MHz and 85 MHz.

15. A method to capture an upstream signal in a subscriber device, comprising:
diverting a portion of an upstream signal into an analog-to-digital converter (ADC);
converting a portion of the upstream signal into a digital signal;
during transmission of the upstream signal, triggering a gate via a transmit-enable signal and disabling capture of the upstream signal; and
when the gate is not triggered by the transmit-enable signal, and when the digital signal exceeds a threshold, capturing the digital signal in a memory.

16. The method to capture an upstream signal in a subscriber device of claim 15, comprising:
amplifying the diverted upstream signal.

17. The method to capture an upstream signal in a subscriber device of claim 15, comprising:
converting the digital signal into at least 10 bits of resolution.

18. The method to capture an upstream signal in a subscriber device of claim 15, comprising:
providing a trigger when the subscriber device is not transmitting; and
applying the trigger to at least one act of diverting, converting, and capturing.

* * * * *